No. 692,609. Patented Feb. 4, 1902.
W. BROUGH.
AUTOMATIC WEIGHING MACHINE.
(Application filed May 1, 1901.)
(No Model.) 2 Sheets—Sheet 1.
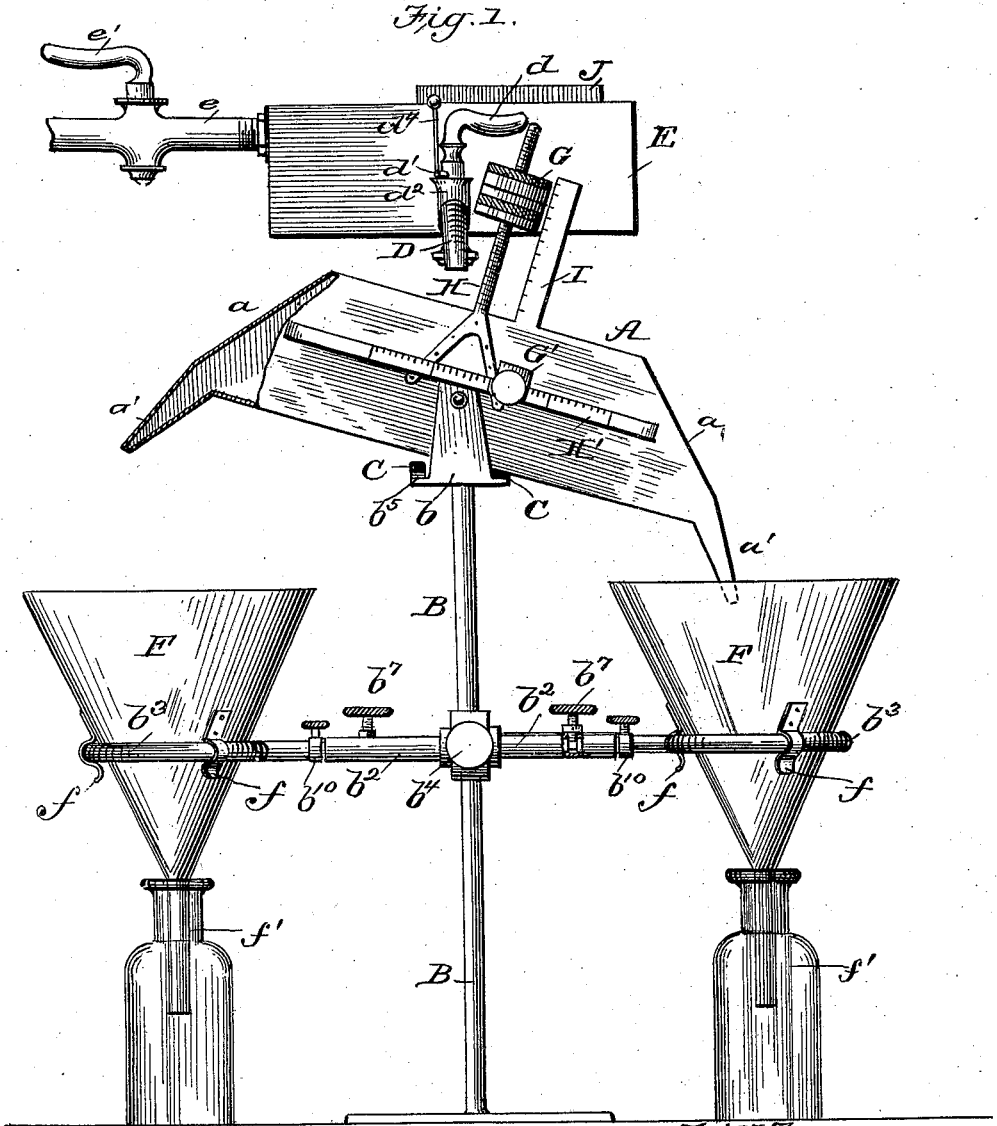

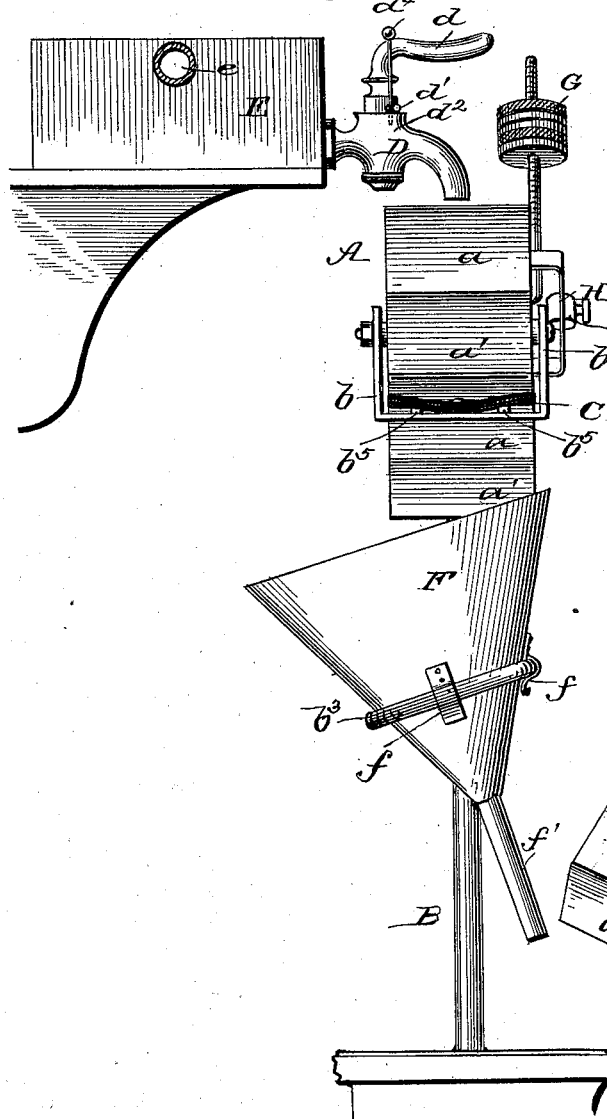
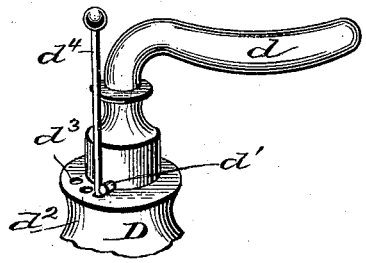
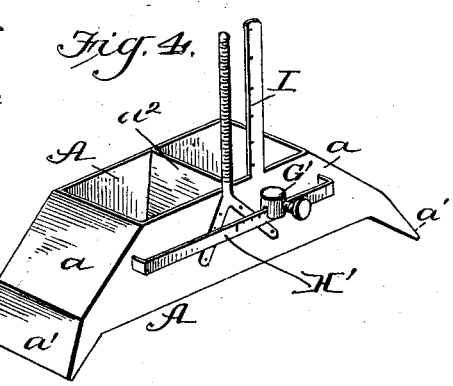
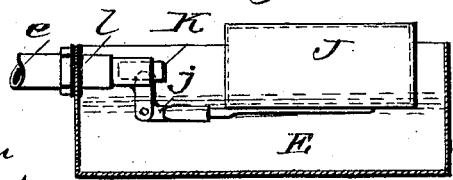

UNITED STATES PATENT OFFICE.

WILLIAM BROUGH, OF BALTIMORE, MARYLAND.

AUTOMATIC WEIGHING-MACHINE.

SPECIFICATION forming part of Letters Patent No. 692,609, dated February 4, 1902.

Application filed May 1, 1901. Serial No. 58,258. (No model.)

*To all whom it may concern:*

Be it known that I, WILLIAM BROUGH, a citizen of the United States, residing in Baltimore, in the State of Maryland, have made 5 certain new and useful Improvements in Automatic Weighing-Machines, of which the following is a specification.

My invention is an improvement upon that forming the subject of my application for Letters Patent, Serial No. 24,400, filed July 21, 1900, and for which a patent was issued April 30, 1901.

The present apparatus is particularly adapted for measuring liquids, but may also be used for pulverulent substances with some slight modifications. The details of construction, arrangement, and operation are as hereinafter described, reference being had to the accompanying drawings, in which—

Figure 1 is a side elevation of my improved apparatus, a portion of the tiltable hopper being broken away. Fig. 2 is an end elevation of the apparatus, a supply-pipe being shown in section. Fig. 3 is a detail perspective view of the discharge cock or faucet of the tank or reservoir employed in connection with the tiltable hopper. Fig. 4 is a perspective view of the hopper. Fig. 5 is a vertical section of the supply tank or reservoir. Fig. 6 is a plan view of the main portion of the supports or holders for the funnels. Figs. 7 and 8 are views showing details of construction and combination of parts of such a holder or support.

The hopper A is pivoted at the middle of its length between the vertical forks or lugs of a standard B, having a suitable flat base. The head $b$ of said standard is horizontal and provided with two elastic buffers C, upon which the hopper A strikes each time it is tilted or vibrated. The said hopper is provided with a horizontal partition $a^2$, (see Fig. 4,) whereby it is divided into two equal compartments. I preferably construct the hopper of sheet metal. In the course of experiments in measuring liquids I have found it necessary to provide the hopper with hoods $a$, extending far back from the ends, so as to cover a large portion of the compartments into which the liquid is received, whereby the liquid being measured is prevented from splashing out as it moves suddenly toward one end of the hopper when the latter is tilted. I have also found that it is indispensable to provide the hopper with discharge spouts or nozzles $a'$, extending downward for a considerable length, so that the liquid shall be delivered into the funnels in such manner as to prevent it spattering or splashing out of the funnels. In brief, with the provision of the hoods $a$ and spouts $a'$ the hopper is perfectly adapted to measure liquids of the lowest specific gravity without waste.

The spouts or nozzles $a'$ are arranged at an obtuse angle to the longitudinal axis of the hopper and provided with discharge-orifices which have the same or nearly the same width as the body of the hopper, but are very narrow in the direction of the length of the latter, since this construction has been demonstrated to be the best to meet all requirements as to rapidity of flow or discharge without waste of the liquids. A vertical rod H is attached to one side of the hopper at its middle and carries an adjustable weight G. Alongside the rod H is arranged a graduated bar I.

A horizontal graduated bar H' is arranged on the side of the hopper, and a weight G' is adapted to slide thereon. It is apparent that by adjustment of the weights the hopper may be balanced or set for receiving any desired weight or quantity of a liquid or other commodity to be weighed in measure and that by adjusting the weight G upward on rod H the leverage of the hopper A is increased and by adjusting it downward the leverage is lessened correspondingly, so as to weigh larger or smaller quantities.

F indicates two funnels, which are supported in the rings $b^3$ of a vertically-adjustable bar $b^2$, the same being provided with a clamp-screw $b^4$, whereby the funnels may be set higher or lower on the standard B, as conditions require. The shanks of the rings $b^3$ are adjustable in sockets of the bar $b^2$, so that the distance between the funnels may be increased or diminished, as required.

In order that bottles may be conveniently set on the platform B' beneath the bottles, with the nozzles $f'$ of the latter projecting into their necks, and that they may be removed with equal facility, I adapt the ring holders $b^3$ to rotate sufficiently to allow the funnels to be tilted at a slight angle, as shown in Fig. 2. To permit this movement, the shanks of the rings $b^3$ (see Fig. 8) are provided with one or more circumferential grooves $b^6$ to receive the point of a clamp-screw $b^7$, whereby the longitudinal movement or detachment of the ring-shanks from sockets $b^2$ is prevented without interfering with the rotation of the rings necessary to allow due tilt of the funnels $f$. When the nozzles $f'$ are inserted in bottles, as shown in Fig. 1, the bottles hold the funnels vertical. When the bottles are removed, the funnels swing or tilt, as shown in Fig. 2, and remain in that position until restored to the vertical by application of another bottle. This is insured by weighting the rear side of the rings $b^3$, and this is practically accomplished by making the rings $b^3$ eccentric to their shanks, as shown in Fig. 6. This eccentricity serves also to bring the funnels into due vertical relation to the hopper, as required for discharge of its contents into the center of the funnels.

In order to limit the rotary movement of the funnels, I provide stops, as illustrated in Figs. 6 and 7. The outer ends of the sockets $b^2$ are provided with a lug $b^8$, (see Fig. 7,) and the adjacent ends of the ring-shanks are provided with a collar $b^{10}$, having two lugs $b^{11}$. As shown in Fig. 6, the lug $b^8$ lies and has a certain play between the lugs $b^{11}$. It is obvious this play will determine the limits of the tilting movement of the funnels. The funnels F are secured detachably in the ring supports $b^3$ and duly supported in vertical position by means of spring-clasps $f$. The latter are formed of spring material, preferably a spring-plate, which is riveted to the sides of the funnel, the lower ends being curved outward and then inward, so as to form practically an S shape, whereby they are adapted to engage the rings $b^3$ when the funnels are forced down and lock the funnels in place and at the same time permit them to be readily disengaged when occasion may require.

As shown in Fig. 2, the buffers C consist of thick pieces of rubber arranged transversely on the standard-head $b'$ and their outer portions being supported slightly raised by means of small blocks $b^5$. By this arrangement the free ends of the buffers C receive the impact of the hopper A when tilted, and thereby lessen the shock and noise which would otherwise result.

The liquid to be weighed and measured is received from a suitable source of supply into a tank or reservoir E through the medium of a conducting-pipe $e$, having a cock or faucet $e'$. The said tank E is supported upon a bracket or by other suitable fixture and provided with a discharge cock or faucet D, whose nozzle is directly over the hopper A and in vertical alinement with the standard B. A float J is arranged in the tank E and provided with an elbow-lever $j$, which operates a plug or valve K, which is adapted to seat and slide in the pipe $e$. It is apparent that by means of this apparatus the liquid in tank E may be kept at a uniform height, since the float J will so regulate the valve K as to admit only a certain quantity to the tank. By maintaining such uniformity of level of the liquid in the tank I insure uniformity of pressure and discharge of the same by the faucet D. To further regulate the discharge as conditions may require, I provide a movable stop for the faucet valve or plug $d$, as shown best in Fig. 3—that is to say, the plug $d$ is provided with a lateral pin $d'$, and the box $d^2$ of the faucet is provided in its upper edge with a series of holes $d^3$, which are adapted to receive a stop-pin $d^4$. By setting the said pin $d^4$ in one or the other of the holes $d^3$ it is apparent that the rotation of the plug $d$ may be limited and that thereby the size of the aperture through which the liquid flows past the plug may be regulated as required. The pin $d^4$ may be quickly removed from a hole $d^3$ and set in another one as required to allow greater or less rotation of the plug $d$.

It is to be understood that bottles or other form of receptacles are to be set under the funnels $f$ prior to the tilting of the hopper A to one side or the other, that the faucets $d$ and $e'$ being opened the liquid will discharge at a uniform rate into the compartments of the hopper A alternately, and that the latter will discharge alternately into one funnel or the other. As shown in Fig. 2, the nozzles $a'$ have the same width as the body of the hopper, so that although the orifice is narrow it has such width that the discharge is rapid. It is further apparent that the funnels $f$ may be adjusted higher or lower, so that the nozzles $a'$ will dip into them to a greater or less depth. This adjustment has some importance in view of the difference of liquids in consistency. In any case the nozzles $a'$ are to be made considerably narrower than the upper portions of the funnels, so that there will be no danger of the liquid spattering out of the funnels, and thus being wasted or falling upon surrounding objects.

What I claim is—

1. The improved automatic liquid-weighing apparatus, comprising the fixed tank E, and its valve and float for maintaining a uniform height of liquid in the tank, a discharge-cock, and the tiltable hopper, arranged centrally in relation to said cock, and provided with hoods and discharge-spouts arranged and projecting downward, as shown and described.

2. In a liquid-weighing apparatus, the hopper supported centrally on horizontal pivots and having its ends provided with the inwardly-inclined hoods $a$, and the discharge-spouts $a'$, which extend downward at an obtuse angle to the flat bottom of the hopper and are provided with narrow discharge-openings, substantially as shown and described.

3. In a liquid-weighing apparatus, the tiltable hopper having its ends provided with covers or hoods $a$, and discharge-spouts which extend downward and have nearly the same width as the body of the hopper and are very narrow in the direction of the length of the hopper, so as to deliver the liquid in a wide but thin sheet, as shown and described.

4. In a weighing apparatus of the class described, the combination, with the pivoted tiltable hopper and a support therefor, of an elastic buffer consisting of a strip of elastic material secured at the middle of its length, and blocks arranged between the middle and ends of said strip, whereby the latter is held supported at its free ends to operate as and for the purpose described.

5. In an apparatus of the class described, the combination, with ring supports, of funnels having spring-clasps adapted to engage said supports, substantially as shown and described.

6. In an apparatus of the class described, the combination, with ring supports, of funnels having spring-clasps attached to their sides and having an S-shaped curve whereby they are adapted to engage the said supports detachably, substantially as shown and described.

7. In an apparatus of the class described, the combination with a support of a funnel-holder adapted to rotate horizontally and weighted on one side whereby it is adapted to normally maintain an inclined position as shown and described.

8. In an apparatus of the class described, the combination with a supporting-bar having a socket, of a holder for a funnel, having a shank provided with a circumferential groove, and a securing device which enters said groove as shown and described.

9. In an apparatus of the class described, the combination with a support of a funnel-holder adapted to rotate on its axis, and a stop for limiting its movement as and for the purpose specified.

10. In an apparatus of the class described, the combination with a supporting-bar having a socket and a lug as specified, of a funnel-holder whose shank is provided with two lugs or shoulders between which the single lug projects and is adapted to play as shown and described.

WILLIAM BROUGH.

Witnesses:
AMOS W. HART,
JOS. A. RYAN.